United States Patent [19]
Matsuki

[11] 4,424,940
[45] Jan. 10, 1984

[54] REEL UNIT ROTATION STOPPING SENSING MECHANISM

[75] Inventor: Seiichiro Matsuki, Kawagoe, Japan

[73] Assignee: Pioneer Electronic Corporation, Tokyo, Japan

[21] Appl. No.: 336,811

[22] Filed: Jan. 4, 1982

[30] Foreign Application Priority Data

Jan. 7, 1981 [JP] Japan .................................. 56-892

[51] Int. Cl.³ ...................... B65H 59/38; G03B 1/02; G11B 15/13
[52] U.S. Cl. .................................. 242/191; 360/74.2
[58] Field of Search ............................. 242/186–191, 242/200, 201; 360/71, 73, 74.1, 74.2, 74.3

[56] References Cited
U.S. PATENT DOCUMENTS

| | | | |
|---|---|---|---|
| 2,855,160 | 10/1958 | Fundingsland | 242/187 |
| 4,010,918 | 3/1977 | Kato | 242/191 |
| 4,147,898 | 4/1979 | Tozune et al. | 360/74.1 X |
| 4,210,944 | 7/1980 | Fushimi et al. | 360/74.2 |

*Primary Examiner*—Leonard D. Christian
*Attorney, Agent, or Firm*—Sughrue, Mion, Zinn, Macpeak and Seas

[57] ABSTRACT

A reel unit rotation stopping sensing mechanism for a tape deck having reel shaft units engageable with a tape unit is disclosed. The reel unit rotation stopping sensing mechanism includes rotational arm means frictionally engaged with the reel shaft units, a rotary mechanism rotatable around a predetermined axis, drive means for imparting a rotational torque to the rotary mechanism, and link mechanism formed between free ends of the rotational arm means and the rotary mechanism for preventing the rotation of the rotary mechanism when at least one of the reel shafts is stopped in rotation.

3 Claims, 20 Drawing Figures

REEL UNIT ROTATION STOPPING SENSING MECHANISM

BACKGROUND OF THE INVENTION

The present invention relates to a reel assembly plate rotation stopping sensing mechanism for tape decks.

There have been increasing strong demands for miniaturization of tape decks. In particular in automotive cassette decks, the space in which the cassette deck is installed is very respective and hence its small physical size is desired.

The present invention provides as an object a novel stop sensing mechanism for the tape reel plate, which attributes to the miniaturization of the tape deck and the compactness particularly in thickness thereof.

According to the present invention, the above noted defects or demands may be overcome.

SUMMARY OF THE INVENTION

According to the present invention, a stop sensing mechanism for a reel plate for tape decks, includes drive means for imparting a rotation torque to the rotary member, and locking means for locking the rotary member with a stationary part or component when the reel plate is stopped whereby at this time, reel plate rotation stopping may be detected by a reaction torque caused in the drive means.

BRIEF DESCRIPTION OF THE DRAWINGS

In the drawings:

FIG. 10b is a view showing a spring provision shown in FIG. 10a;

DESCRIPTION OF THE PREFERRED EMBODIMENTS

The present invention will now be described in detail with reference to the accompanying drawings.

Figure 1:
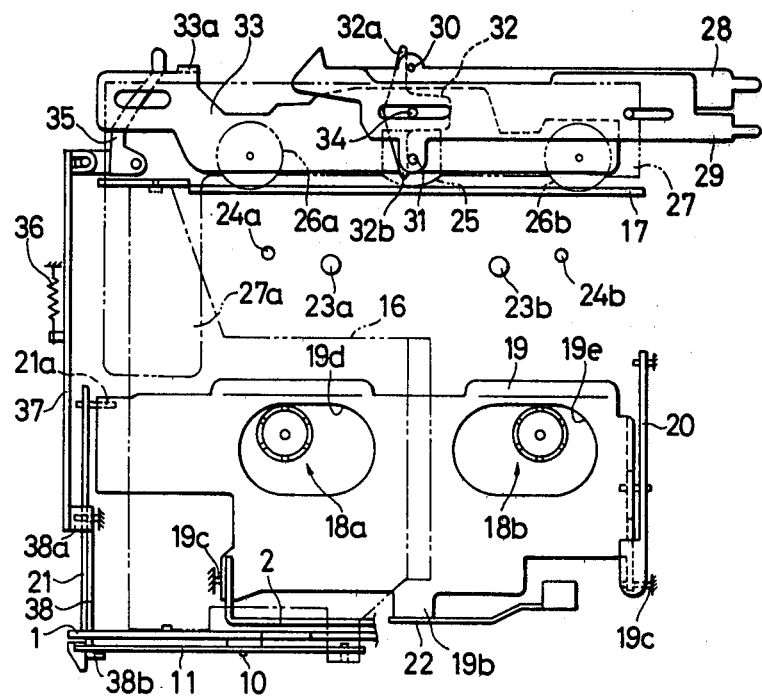
FIG. 1 is a schematic plan view of the cassette insertion, holding and ejecting mechanism according to the present invention.

A cassette holder 16 is substantially in the form of a rectangular shape and is rotatably supported to the side frame 1 and another side frame 17 as shown in FIG. 1. When a cassette (not shown) is fully inserted the cassette holder 16 is rotated in the clockwise direction under the biasing force acting on the rotational arm 11 to thereby lower the cassette to the tape play position. At this time, reel holes (not shown) of the cassette are engaged with reel units 18a and 18b.

When the cassette is inserted, a lower primary surface which is substantially in the form of a rectangular shape is supported by a rotatable cassette support plate 19 around a support axis 19c and an auxiliary arm 20 as shown in FIG. 1 whereas the other surface, that is, an upper primary surface of the cassette is held by the cassette holder 16. The cassette support plate 19 and a pair of holes 19d and 19e which are engageable with the reel units 18a and 18b of the cassette. The rotational axes of the cassette holder 16 and the cassette support plate 19 are perpendicular to the up-and-down direction of the cassette and are preferably perpendicular to each other at a predetermined distance. That is, as expressed in another way, free edges of the cassette holder 16 and the cassette support plate 19 are arranged so as to intersect with each other in the vicinity of the center of the cassette which is inserted to a position where the cassette 15 is engageable with the reel units 18a and 18b, and the cassette holder 16 and the cassette support plate 19 are adapted to clamp the cassette therebetween. The cassette support plate 19 is freely rotatable around the support axis 19c fixed to an under-frame (not shown) and is engaged with a rear end of the rotational arm 11 through a lift arm 21 mounted rotatably on a rear frame (not shown).

The cassette mounted on the reel shafts 18a and 18b is spring-biased in a magnetic head direction described later in detail by a cassette push spring 22 (shown in FIG. 1). The cassette push spring 22 is pressed by the rear end 19b of the cassette support plate 19 in order not to prevent the downward motion of the cassette so that the spring 22 is positioned so as to deviate from the lowering path of the cassette. The cassette push spring 22 is gradually advanced as the rear end 19b of the cassette support plate 19 is rotated around the support axis 19c during the downward movement of the cassette, thereby biasing the cassette in the opposite direction.

In FIG. 1, reference characters 23a, 23b and 24a, 24b denote guide pins and capstans, respectively, which are engageable with holes formed in the cassette. A head 25 and a head plate 27 on which pinch rollers 26a and 26b are mounted are movable in the vertical direction and are driven by a device (not shown) when the tape recorder is in a reproduction mode (PLAY) or in a recording interval (non-record band), thereby moving from the position shown in FIG. 1 forwardly. With this movement, the magnetic head 25 is pressed against the tape and at the same time allows the pinch rollers 26a and 26b made of rubber or the like to pressingly contact against the capstans 24a and 24b in compliance with the tape travelling direction. At the position where the head plate 27 is advanced, the end portion 27a thereof is positioned above a pin 21a formed at an end of the lift arm 21 so that the rotation of the lift arm 21 is limited to thereby prevent the eject of the cassette 15.

Reference numerals 28 and 29 denote an FF lever for tape fast feed (FF) and an REW lever for tape rewind (REW), respectively, which are provided slidably with respect to the side frame 17. On the FF lever 28 and the REW lever 29 are fixed pins 30 and 31 which are engaged with engagement ends 32a and 32b of a arm 32, respectively. The arm 32 is mounted on a pin 34 fixed to a first cam 33 which is slidable with respect to the side frame 17. It should be noted that when the FF and REW levers 28 and 29 are independently depressed, they act as command levers for FF and REW but when the two levers 28 and 29 are depressed at a time, they are adapted to cooperate with each other to carry the eject mode of the cassette (EJECT). Namely, when the levers are depressed at a time, the movement of the pin 34 becomes twice a movement of that of the independent depression. On the basis of the difference between the depression in movement, the eject operation may be achieved.

The movement of the pin 34 is equal to the movement of the first cam 33. In compliance with the simultaneous depression of the FF lever 28 and the REW lever 29 for the eject operation, the first cam 33 is moved by a predetermined distance in the leftward direction in the figure, a protuberance 33a is in abutment with an end of a arm 35 which is freely rotatable, thereby allowing the arm 35 to rotate in the counterclockwise direction. The other end of the arm 35 is engaged with an end 38a of a rotatable lock release lever 38 through a connection lever 37 biased upwardly by a spring 36. The other end 38b of the lock release lever 38 is moved downwardly by the eject operation.

Figure 2:
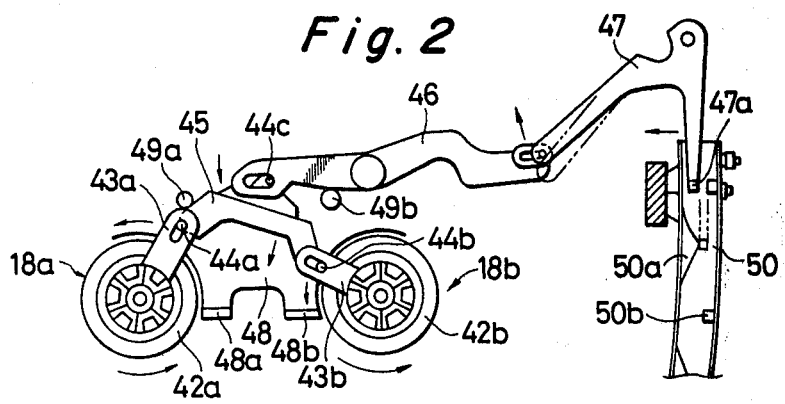
FIG. 2 is a schematic plan view of one example of a reel plate rotation stopping sensing mechanism according to the present invention.

FIG. 2 is a schematic plan view showing one example of reel assembly rotational stopping sensing means. The sensing means serves to command the change-over of the travelling direction by sensing the terminal end of the tape and to command the change-over to a constant speed travel by sensing the absorption of the loose tape according to a tape looseness absorbing mechanism. In FIG. 2, reel members 42a and 42b which engage the reel units 18a and 18b are in frictional engagement with engagement arms 43a and 43b. A swingable arm 45 is engaged with slots formed in end portions of the engagement arms 43a and 43b, via pins 44a and 44b. An end of a arm 46 is engaged with a swing pin 44c fixed to the swingable arm 45 whereas the other end of the arm 46 is engaged with an end of arm 47 which is rotatably mounted. When the reel assemblies 42a and 42b are rotated in the counterclockwise direction, i.e., in the normal direction, the engagement arm 44a and 44b are moved in the direction indicated by the arrows in the figure. The engagement arm 44a is at a standstill as shown in FIG. 2 while the end of the swingable arm 45 is in abutment with an engagement pin 49a fixed to the chassis 48. On the other hand, the engagement arm 44b is always urged to a position where it is in abutment with a projection 48b of the chassis 48. As a result, through the swingable arm 45, the arm 46 is driven in the counterclockwise direction and the arm 47 is driven in the clockwise direction.

The claw 47a of the arm 47 is engaged with an inner flanged periphery of an inwardly toothed gear 50 which is always rotated by a motor described later. In the figure, a schematic view of the inner flanged periphery of the inwardly toothed gear 50 is shown. On one side of the inwardly toothed gear 50 is formed a wave-shaped cam 50a. On the other side confronting troughs of the wave-shaped cam 50a are formed projections 50b. Accordingly, when the arm 47 is rotated in the clockwise direction as mentioned above, the claw 47a is pressed on the profile of the cam 50a, so that the claw 47a is moved right and left along with the profile of the cam 50a. When the reel members 42a and 42b are stopped so that no force is applied to the arm 47 in the clockwise direction, the claw 47a of the arm 47 is stopped at a crest of the wave-shaped cam 50a as indicated by the dotted line and brought into contact with the projection of the inwardly toothed gear 50 to prevent the rotation of the inwardly toothed gear 50. By the forcible stopping of the inwardly toothed gear 50, a tension is applied to the tape to thereby eliminate looseness of the tape so that detection of termination of the tape is achieved.

In eliminating the looseness of tape, it is to be noted that one reel assembly is stopped by a ratchet mechanism (not shown) and the other is rotated at a high speed so that the rotation of reels is terminated. Also, in case where the reel members 42a and 42b are rotated in the clockwise direction (reverse direction), the engagement arm 43b is stopped by a stopping or engagement pin 49b and the engagement arm 43a is always urged to rotate in the clockwise direction the arm 47 is rotated in the clockwise direction through the swingable arm 45 and the arm 46. Thus, a like operation is achieved as in the normal direction.

Figure 3:
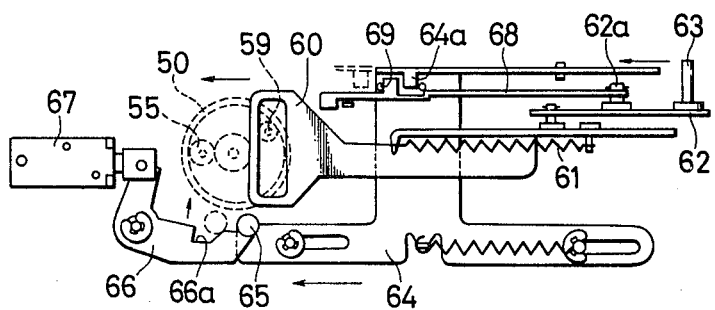
FIG. 3 is a schematic side view of a head plate drive mechanism according to the present invention.
Figure 4:
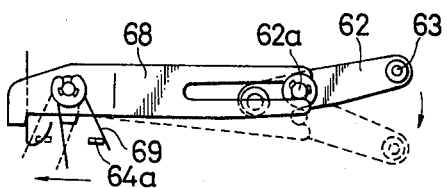
FIG. 4 is a schematic side view of part of the drive mechanism.
Figure 5:
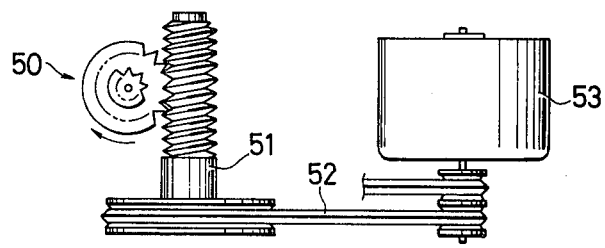
FIG. 5 is a schematic side view showing the drive portion shown in FIG. 13.
Figure 6:
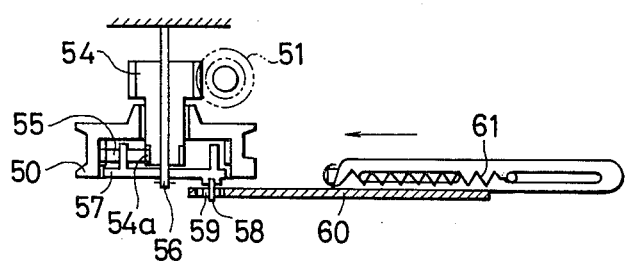
FIG. 6 is a view showing the inwardly toothed gear and the associated parts therewith shown in FIG. 13.

FIG. 3 is a schematic side view of one example of a head plate drive mechanism and FIG. 4 is a partial plan view thereof. In the figures, reference numeral 50 denotes the inwardly toothed gear of the above described sensing mechanism. As best shown in FIG. 5, the inwardly toothed wheel 50 is always rotated via a worm gear 51 and a belt 52 by a motor 53. As shown in FIG. 6, the inwardly toothed or ring gear 50 is rotatably mounted on a gear member 54 driven by the worm gear 51 and is engaged with a sun gear 54a of the gear member 54 through a planetary gear 55. The planetary gear 55 is rotatably mounted on a gear support 57 rotatably mounted on a center shift 56. On the other side of the gear support 57 is implanted a pin 58 with which a lever, i.e., crank lever 60 engages through a roller 59.

Now, if the inwardly toothed gear 50 is rotatable, since the gear support 57 is prevented from rotating, the planetary gear 55 is rotated at a stationary position to thereby rotate the inwardly toothed gear 50. Then, when the above described sensing mechanism detects, for example, the elimination of looseness of tape so that the inwardly toothed gear 50 is prevented from rotating, the planetary gear 55 is rotated around its own axis and at the same time is rotated around the center shaft 56. As a result, the gear support 57 is also rotated to allow the lever 60 engaging with the pin 58 to move in a direction by an arrow in FIG. 6. After the lever 60 reaches the left dead center, it returns back to the original position by a spring 61 so that the planetary gear 55 and the gear support 57 are rotated one turn, respectively. Namely, with such construction, the rotational motion of the motor 53 is converted into a linear motion of the lever 60.

In FIG. 3, the lever 60 is moved in the left direction, so that an arm 62 rotatably mounted on the lever 60 is also moved. A pin 63 is fixed to a free end of the arm 62 and by the movement of the arm 62 the pin 63 is brought into contact with an end of a lever 64 to thereby allow the lever 64 to move in the left direction. A pin 65 is fixed to another end of the lever 64 and the pin 65 is engaged with an end of an arm 66. The arm 66 is driven in the counterclockwise direction by a key-off solenoid 67 which is energized during a period from the cassette insertion to the cassette eject. Therefore, by the engagement of the pin 65 with a retaining portion 66a of the arm 66, the lever 64 moved in the leftward direction is locked. After the lever 64 is locked, the lever 60 is restored by the force of the spring 61. A rotatable arm 68 is engaged with an extension of the lever 64 through a spring 69 and is engaged at its end with a pin 62 formed on the arm 62. For this reason, when the lever 64 is moved in the leftward direction. The right arm 68 and the arm 62 are moved by the force of the spring 69 as shown in FIG. 4.

Figure 7:
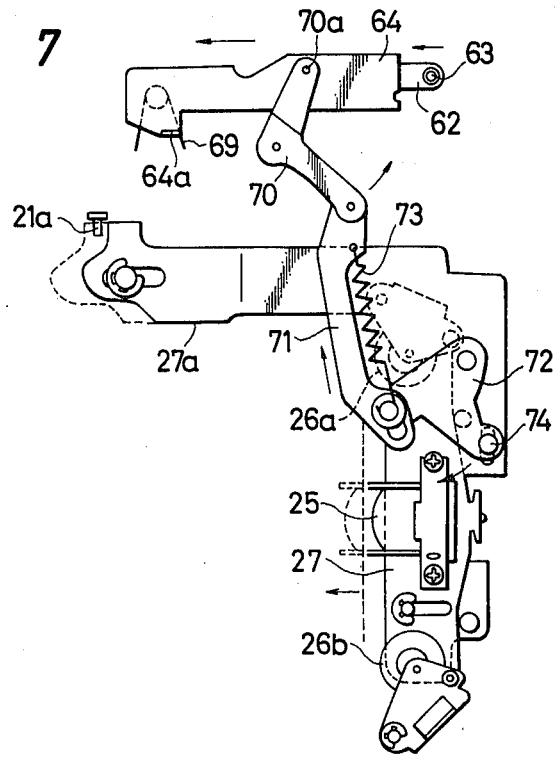
FIG. 7 is a view illustrating the drive operation of the head plate.

As shown in FIG. 7, a rotatable arm 70 is coupled at an end to the lever 64. The other end of the arm 70 is coupled to an end of an arm 72 through a arm 71. The arm 72 is urged to be rotated clockwise by a spring 73, and is rotated clockwise through the arm 70 and the arm 71 by the leftward movement of the lever 64 so that the head plate 27 which is engaged with the arm 72 through a pin 74 is advanced to a position indicated by a dotted line. As described before, in the advanced state, the head plate 27 is positioned to define the rotation of the lift arm 21 and to prevent the eject operation of the cassette with the end portion 27a thereof being above the pin 21a of the arm 21 (shown in FIG. 1). Since in the eject state of the cassette or the off-state of the electrical source a solenoid 67 is deenergized, the lever 64 is biased rightwardly in the figure under the force of the spring 61 and is turned back to the original position by the pin 65 while allowing the arm 66 to rotate in the clockwise direction. Thus, the head plate 27 is moved rearwardly to release the restriction of rotation of the lift arm 21 by the end portion 27a thereof.

Figure 8:
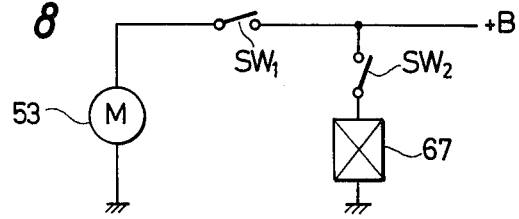
FIG. 8 is a circuitry for controlling the motor and the key-off solenoid.
Figure 9:
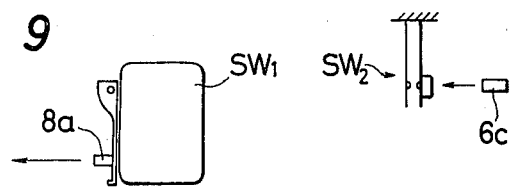
FIG. 9 is a view illustrating the operational timing of the switches SW1 and SW2.

FIG. 8 shows one example of a control circuit for the motor 53 and the key-off solenoid 67. The motor 53 is connected between an electrical source +B and a ground via a switch SW1 whereas the key-off solenoid 67 is between the electrical source +B and the ground via a switch SW2. The switches SW1 and SW2 are so arranged that they are actuated by projections 8a and 6c respectively on levers (not shown) which are adapted to cooperate with each other in the cassette insertion and ejection. FIG. 9 shows a positional relationship between the switches SW1 and SW2 and the projections 8a and 6c. More specifically, before the insertion of the cassette, the switch SW1 is turned off by the depression of the actuator with the projection 8a and the switch SW2 is not engaged with the projection 6c. Then, the projections 8a and 6c are simultaneously moved in the direction indicated by the arrows by the cassette insertion or loading. By the disengagement from the projection 8a the switch SW1 is turned on to thereby operate the motor 53 and subsequently the projection 6c presses the switch SW2 so that the switch SW2 is turned on, thereby energising the key-off solenoid 67.

On the other hand, in the ejection of the cassette, by the opposite operation to the cassette loading, the engagement with the projection 6c is released so that the switch SW2 is turned off. As a result, the activation of the key-off solenoid 67 is released and after a predetermined lapse of time the projection 8a presses the actuator of the switch SW1 so that the switch SW1 is turned off, thereby stopping the motor 53. In such a manner, by releasing the activation of the key-off solenoid 67 prior to the stopping the motor 55 in the eject, even if the eject operation is carried out in the midway of the advance drive of the head plate 27 (FIG. 7), the head plate 27 is not stopped in an intermediate way, and the eject operation is ensured.

FIG. 10 is a schematical plan view showing one example of a normal and reverse rotation switching mechanism. FIG. 11 is a partial side view thereof. In the figure, the worm gear 75 is drivingly rotated by the above described motor 53 (FIG. 5) via a belt 76, thereby driving a second gear 78 through a first gear 77. A non-toothed portion 79a of a partially non-toothed gear 79a is confronted with the second gear 78. The partially non-toothed gear 79 is actuated by a actuating mechanism described later, thereby attaining the normal and reverse rotation switching operation while engaging the second gear 78.

Figure 12:
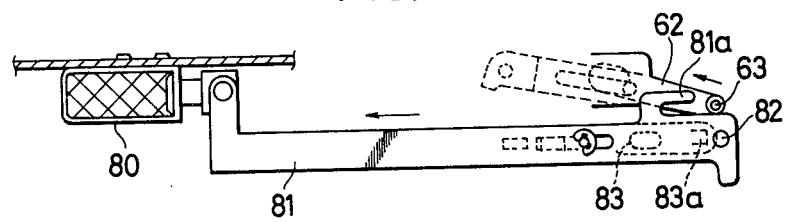
FIG. 12 is a schematic side view of one example of the actuating mechanism.

The actuating mechanism is adapted to drive a lever 81 in the leftward direction in the drawing figure by an electrical actuation of a solenoid 80 or a mechanical actuation of the aforesaid sensing mechanism as shown in FIG. 12 as a result of which the partially non-toothed gear 79 is actuated. In FIG. 12, when the head is advanced and is locked by the key-off solenoid 67 (FIG. 3), the pin 63 of the arm 62 is brought into contact with the lever 81. For this reason, when the reel members are stopped at the end of the tape and the sensing mechanism is operative to thereby drive the arm 62 of the leftward direction, the pin 63 of the arm 62 is engaged with a retaining portion 81a of the lever 81 so that the lever 81 is driven in the direction indicated by the arrow. Also, by the activation of the solenoid 80, the lever 81 is driven in the same manner in the direction indicated by the arrow. Thus, since a pin 82 formed on an end of the lever 81 is in abutment with a projection 83a of a lever 83, the lever 83 is also moved in the direction indicated by the arrow. In FIG. 23, the lever 83 is biased by a spring 84 rightwardly, locking the partially non-toothed gear 79 at its end projection 85a. More specifically, the partially non-toothed gear 79 has a pair of pins 87a and 87b at about 90 from the two cutaway portions forming an angle of 180°, and is biased to rotate counterclockwise by a spring 88. Further, the gear 79 is restricted in angular rotation by a projection 85 of an arm 85. The restriction is released by the counterclockwise rotation of the arm 85, and the partially non-toothed gear 79 is rotated in the counterclockwise direction by the spring 88 to engage with the second gear 78. When the gear 79 is drivingly rotated by the second gear 78 so that the non-toothed portion 79a faces the second gear 78 after a 180° rotation, the gear 79 is again locked by the projection 85a of the arm 85.

Figure 10A:
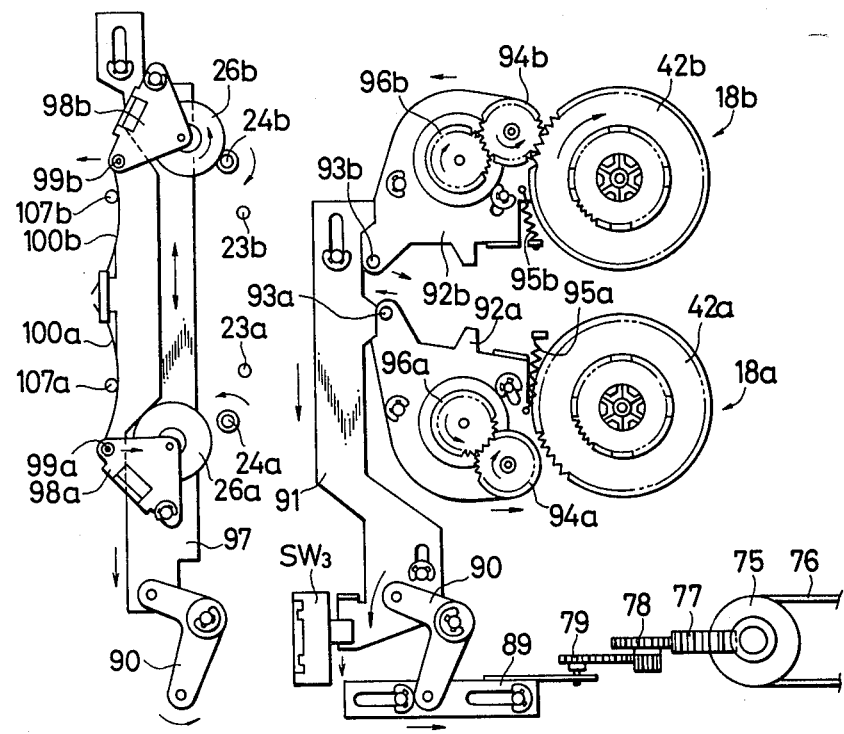
FIG. 10a is a plan view of one example of the normal and reverse change-over mechanism.
Figure 11:
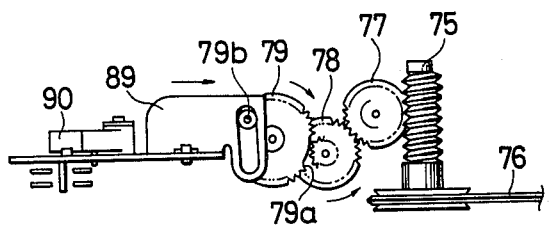
FIG. 11 is a schematic side view of part of the construction of the actuating mechanism.

In FIGS. 10a and 11, by the rotation of 180° of the non-toothed portion 79a, and lever 89 engaged with the pin 79b is moved in the rightward direction. The lever 89 allows a second cam 91 to be driven downwardly in the figure via an arm 90. As shown, idler plate 92a and 92b are engaged through pins 93a and 93b with cam surfaces of the second cam 91. The position shown is in a reverse play (reverse direction reproduction). The idler plate 92a corresponds to the reel unit 18a on the normal play (normal direction reproduction) side and the idler plate 92b corresponds to the reel unit 18b in the reverse play side. When the second cam 91 is moved downwardly in the figure, the idler plates 92a and 92b are moved as indicated by the arrows so that the idler gear 94b on the reverse side is separated from the outer gear of the reel plate 42b and the idler gear 94a on the normal side is engaged with the outer side gear of the reel plate 42a under the force of the idler spring 95a. The idler plates 92a and 92b are driven by the second cam 91 and at the same time an NR (normal and reverse) switch SW3 is actuated by the second cam 91. By the change-over of the switch SW3 the head 25 is switched from the reverse to the normal. Reference characters 96a and 96b denote fly-wheels rotated together with the capstans 24a and 24b (FIG. 1).

Figure 10B:
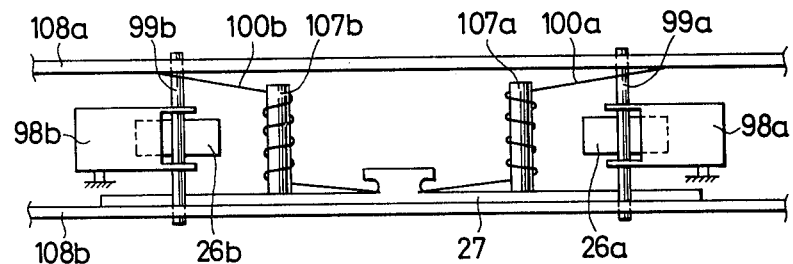

A third cam 97 is engaged also with the arm 90 and the third cam 97 is moved in synchronism with the second cam 91 during the rotation of the arm 90. As shown in FIG. 10, in the reverse play mode, roller arms 98a and 98b on which are rotatably mounted pinch rollers 26a and 26b, respectively are in contact with the cam surface of the third cam 97 through pins 99a and 99b. The roller arms 98a and 98b as shown in FIG. 10b are rotatably mounted on pins 107a and 107b fixed to the head plate 27 and are biased in directions where the pinch rollers 26a and 26b are contacted against the capstans 24a and 24b, respectively, by springs 100a and 100b ends of which are coupled to the head plate 27 and the other ends of which are coupled to pins 99a and 99b. When the head plate 27 is advanced, the springs 100a and 100b make the pinch rollers 26a and 26b to be brought into the capstans 24a and 24b and after the contact make the head plate 27 to be biased in the advance direction. Also, the contact ends of the springs 100a and 100b with the pins 99a and 99b are in contact with the upper chassis 108a, and the head plate 27 is pressed against the lower chassis 108b by the rotational moment in a plain vertical to the chassis surface around the rotational support point. The third cam 97 is moved in the downward direction in FIG. 10a, so that the roller arms 98a and 98b are rotated in the directions indicated by the arrows, respectively. Then, the contact capstan 24b and the pinch roller 26b is released and the pinch roller 26a is in contact with the capstan 24a on the normal direction side. By the operations, the change-over in the tape travelling direction may be carried out. Incidentally, in FIG. 12, in case where the eject operation is carried out in the midway of the direction swinging operation, the retaining portion 81a of the lever 81 prevents the pin 63 of the arm 62 from being returned to the original positon in which the head plate 27 is driven.

Figure 14:
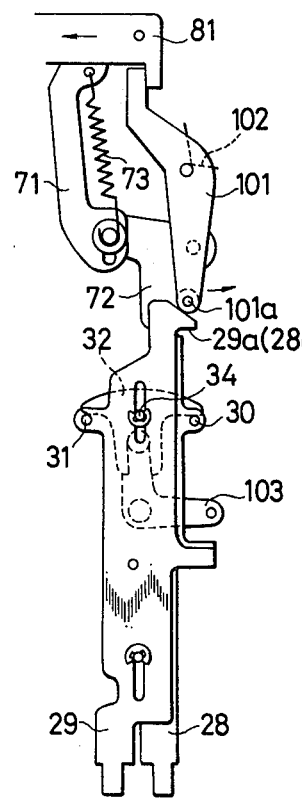
FIG. 14 is a schematic plan view of one example of the fast feed and rewind mechanism.

FIG. 14 is a schematic plan view of a fast feed (FF) and rewind (REW) mechanism according to the invention. FIG. 14 shows a play state thereof. In the play condition, as described with reference to FIG. 7, the arm 72 is rotated in the clockwise direction through the arm 71 when the head is advanced in the position shown. An arm 101 rotatable and biased in the clockwise direction is coupled through a pin 101a to the arm 72 and is, in the play condition, positioned so as to be engaged with respect retaining portions 28a and 29a of FF lever 28 and REW lever 29. As explained with reference to FIG. 1, the FF lever 28 and REW lever 29 serve to command the fast feed and rewind of the tape. In the play mode, the FF and REW operations are performed in the recording interval in which a non-recorded area of the tape is detected between recorded music or signals.

Figure 15:
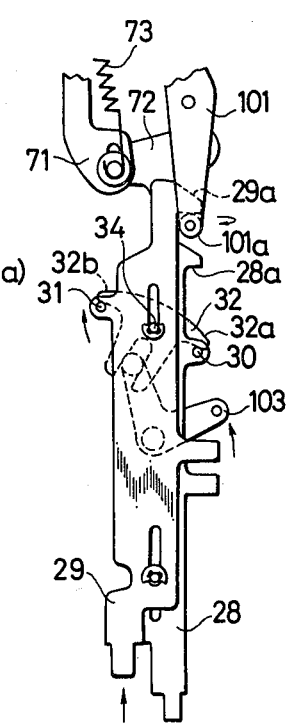
FIG. 15 is a view illustrating the rewind operation in association with the mechanism shown in FIG. 24.

When the REW lever 29 is depressed in the play condition, as shown in FIG. 15, the REW lever 29 is operated to press the engagement end 32b of the second arm 32 through the pin 31 so that the retaining portion 29a is engaged with the pin 101a of the lever 101 thereby locking the REW lever 29. Since the second arm 32 is mounted on the pin 34 fixed to the first cam 33 (FIG. 16), the second arm 32 rotate around the pin 30 of the FF lever 28 as indicated by the arrow and the first cam 33 is moved to a position indicated in dotted lines in FIG. 16. The pins 99a and 99b fixed to the pin 74 and the roller arms 99a and 98b (FIG. 10a) for driving the head plate 27 (FIG. 7), fixed to the arm 72 are engaged with the camming surfaces of the first cam 33. The first cam 33 is moved upwardly (in the figure) so that the pin 74 and the pins 99a and 99b are moved in the direction indicated by the arrow through the camming surfaces. Accordingly, the arm 72 is rotated along the slot formed in the arm 71 against the spring 73 as shown in FIG. 17 so that the pin 74 allows the head plate 27 to move rearwardly. Also in this condition, the head 25 is pressed against the tape under the contact force weaker than that in the play condition. On the other hand, in the reverse play mode, since the pinch roller 26b on the reverse side is in press contact with the capstan 24b (FIG. 24a), the pin 99b is pressed by the camming surface of the first cam 33 to release the contact between the capstan 24b and the pinch roller 26b. When the arm 32 is rotated around the pin 30 of the FF lever 28, the arm 103 rotatable and engaged with the concave portion of the arm 32 is rotated counterclockwise as shown in FIG. 15. The arm 103 controls a well known reel plate drive mechanism (not shown) to be in the REW condition. Thus, the reel plate can rewind the tape thereon.

Figure 13:
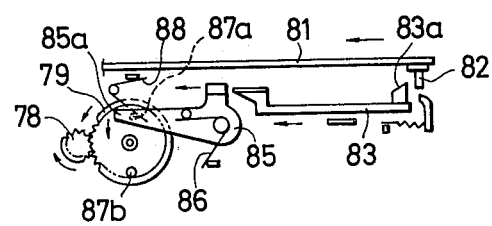
FIG. 13 is a schematic plan view of a part of the actuating mechanism.
Figure 16:
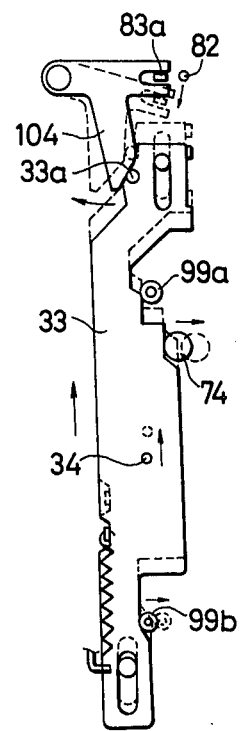
FIGS. 16 and 17 are views showing the operation of the respective parts on the basis of the rewind or fast feed mode.
Figure 17:
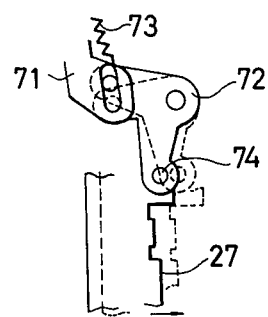

Also, as shown in FIG. 16, the first cam 33 is engaged with a slant surface of an arm 104 rotatable by the pin 33a formed at the end of the first cam 33. When the cam 33 is moved upward (in the figure), the arm 104 is rotated in the clockwise direction. The projection 83a of the lever 83 for actuating the partially non-toothed gear 79 switching the normal and reverse directions as shown in FIG. 13 is engaged with a concave portion of the arm 104. By the rotation of the arm 104, the lever 83 is rotated so that the projection 83a thereof deviates from the path of the pin 82 formed at the end of the lever 81. In this condition, by the record interval detection mechanism, the record interval of the tape is detected and the solenoid 80 (FIG. 12) is activated so that the lever 81 is driven and the arm 101 is rotated in the counterclockwise direction (FIG. 14). Accordingly, the engagement of the REW lever 29 with the pin 101a of the arm 101 is released and the play condition again is restored. Even if the lever 81 is driven, as set forth above, the projection 83a of the lever 83 is positioned to deviated from the path of the pin 82. Therefore, the lever 83 is not driven, so that the partially non-toothed gear for switching the normal and reverse direction operations is not operated. As a result, the change-over in the play direction is not achieved. Namely, this is the reverse play condition prior to the REW operation. Not only in the record interval detection but also in the case where the sensing mechanism is operated at the end of the tape as explained before, the lever 81 is driven so that the operation mentioned above is carried out.

Figure 18:
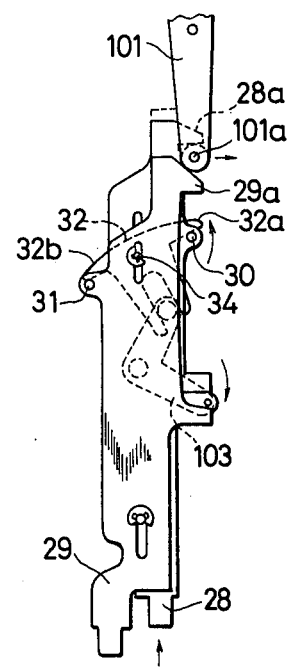
FIG. 18 is a view illustrating the operation in the fast feed.

In the play condition, if the FF lever 28 is depressed, as shown in FIG. 18, the FF lever 28 presses the engagement end 32a of the arm 32 through the pin 30 and the retaining portion 28a of the FF lever 28 is engaged with the pin 101a of the arm 101. Thus, the lever 28 is interlocked. When the arm 32 is rotated around the pin 31 of the REW lever 29 in the direction indicated by the arrow, the first cam 33 is drivingly moved to the position shown in FIG. 16 by the dotted lines. The operations thereafter is the same as the REW mode. On the other hand, if the head is not positioned at the advance position, since the pin 101a of the arm 101 is not engaged with the respective retaining portions of the FF lever 28 and the REW lever 29, the FF lever and the REW lever 28 and 29 are not locked. Thus, during the depression of the levers, the operation of fast feed and rewind is carried out.

At the time when the tape is in contact with the head and travels at high speed in the FF or REW mode so that the record interval (non-recorded are) is detected, the above described record interval detecting mechanism serves to carry out a so-called quick catch of the beginning of music and is provided with a record interval detecting circuit (not shown) on the basis of the reproduced signal out of the head. The interval detecting circuit is turned on and in the play condition, the FF lever 28 or the REW lever 29 is depressed, so that the tape is fed at a high speed under a contact force weaker than that in the play mode. On the basis of the reproduced signal out of the head, the interval is detected and simultaneously therewith the solenoid shown in FIG. 12 is activated and the play condition is again achieved. The solenoid 80 serves to carry out the change-over from the high speed reproduction to the constant speed reproduction (play) and also to change over the direction of the rotation in the play mode.

Figure 19:
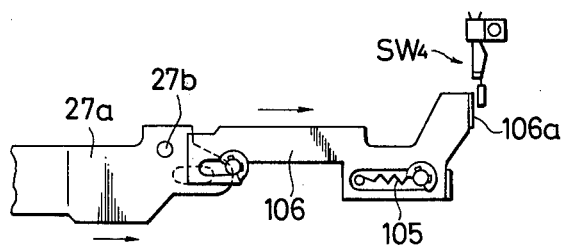
FIG. 19 is a schematic plan view showing the drive portion for the muting switches.

In compliance with the provision of the interval detecting mechanism, a muting circuit (not shown) is provided in order to mute the reproduction sound in the high speed reproduction. The muting circuit is so constructed that it is operative except for the play condition. More specifically, as shown in FIG. 19, a muting lever 106 is positioned in the path of the pin 27b fixed to an end 27a of the head plate 27 and is biased in the head plate direction by a spring 105. A muting switch SW4 is provided in order to operate the muting circuit when closed and is positioned on the path of the projection 106a of the muting lever 106. When the head plate 27 is advanced to the play condition, the pin 27b opened the muting switch SW4 through the muting lever 106 to thereby allow the muting circuit to be inoperative.

As is apparent from the foregoing description, according to the reel plate rotation preventing sensing mechanism of the invention, since in the operation preventing the rotation of the reel plate, the rotational member (the inwardly toothed gear or the ring gear) is engaged with a stationary part such as a chassis so as to be interlocked as a result of which a reaction is used as a detecting signal in the drive means, a force to be applied to the other mechanical parts or components by the detection of the reel plate is not used to effect a mechanism which servers to allow the normal rotation of the reel plate. Thus, the normal rotation ensuring mechanism may be simplified advantateously.

An electrical motor may be used as another means for driving the rotatory member for the sensing mechanism according to the present invention. When the rotator is locked, the rotator may be rotated so that the reactional torque caused by this rotator can be adapted to detect the stopping of the reel plate.

What is claimed is:

1. A reel unit rotation stopping sensing mechanism for a tape deck having reel shaft units engageable with a tape unit, comprising:
   rotational arm means frictionally engaged with said reel shaft units;
   a rotary mechanism rotatable around a predetermined axis;
   drive means for imparting a rotational torque to said rotary mechanism; and
   a link mechanism formed between free ends of said rotational arm means and said rotary mechanism for preventing the rotation of said rotary mechanism when at least one of said reel shafts is stopped in rotation,
   whereby the stopping in rotation of the reel shaft units is detected by a reaction torque caused in said drive means.

2. A reel unit rotation stopping sensing mechanism as defined in claim 1 wherein said driven means includes sun-and-planet motion mechanism having a ring gear, a sum gear and a planetary gear, said ring gear including means for engaging selectively with said link mechanism.

3. A reel unit rotation stopping sensing mechanism as defined in claim 2 wherein said means for engaging includes a wave-shape cam and stop projection means.

* * * * *